US008589026B2

(12) United States Patent
Holt et al.

(10) Patent No.: US 8,589,026 B2
(45) Date of Patent: Nov. 19, 2013

(54) VEHICLE AUXILIARY HYDRAULIC SYSTEM

(75) Inventors: Laurence J Holt, Uxbridge (CA); Paul Lavoie, Howell, MI (US)

(73) Assignee: Multimatic Inc., Ontario (CA)

( * ) Notice: Subject to any disclaimer, the term of this patent is extended or adjusted under 35 U.S.C. 154(b) by 318 days.

(21) Appl. No.: 12/936,316

(22) PCT Filed: Apr. 1, 2009

(86) PCT No.: PCT/CA2009/000392
§ 371 (c)(1),
(2), (4) Date: Oct. 4, 2010

(87) PCT Pub. No.: WO2009/132421
PCT Pub. Date: Nov. 5, 2009

(65) Prior Publication Data
US 2011/0029201 A1  Feb. 3, 2011

(30) Foreign Application Priority Data
May 1, 2008 (CA) ..................................... 2630199

(51) Int. Cl.
*A01B 69/00* (2006.01)
(52) U.S. Cl.
USPC ................... 701/41; 701/36; 701/50; 37/234; 417/270
(58) Field of Classification Search
USPC .......... 701/41, 49, 50, 36; 172/4.5, 9; 37/196, 37/234; 417/2, 3, 270
See application file for complete search history.

(56) References Cited

U.S. PATENT DOCUMENTS

| 3,706,144 | A | 12/1972 | Miceli |
| 4,999,935 | A | 3/1991 | Simi et al. |
| 5,182,908 | A | 2/1993 | Devier et al. |
| 5,190,446 | A | 3/1993 | Salter et al. |
| 5,259,738 | A | 11/1993 | Salter et al. |
| 5,419,129 | A | 5/1995 | Becker et al. |
| 6,073,502 | A | 6/2000 | Wallace |
| 2004/0118621 | A1 | 6/2004 | Curtis |
| 2011/0029201 | A1 | 2/2011 | Holt et al. |

FOREIGN PATENT DOCUMENTS

| CH | 600742 | 6/1978 |
| DE | 9204247 U1 | 7/1993 |
| DE | 202006019306 U1 | 4/2008 |
| JP | 60248442 | 9/1985 |
| JP | 06042371 | 6/1994 |

OTHER PUBLICATIONS

International Search Report and Written Opinion for International Application No. PCT/CA2009/000392, dated Nov. 11, 2010, 6 pages.
"PCT International Search Report dated Jul. 15, 2009 for PCT/CA2009/000392, from which the instant application is based," 2 pgs.

*Primary Examiner* — Gertrude Arthur Jeanglaude
(74) *Attorney, Agent, or Firm* — Fredrikson & Byron, P.A.

(57) ABSTRACT

An auxiliary hydraulic system for vehicles, in particular pick-up trucks, is configured to supply hydraulic fluid under pressure to both on-board and off-board auxiliary equipment such as snow plows, dump boxes and wood splitters. The auxiliary hydraulic system includes a multi-piston fluid pump with electrically selectable poppet valves and an associated microprocessor control that facilitates variable output so that a desired proportional flow can be supplied to the auxiliary equipment. The system also provides a switchable valve arrangement for directional control and an arrangement of fluid distribution pipes and detachable couplings so that a range of different auxiliary equipment can be quickly and simply connected to the system. A simple user interface is also included so that the operator can command the auxiliary equipment from either within or in close proximity to the vehicle.

23 Claims, 6 Drawing Sheets

VEHICLE AUXILIARY HYDRAULIC SYSTEM

RELATED APPLICATIONS

This application is a 35 U.S.C. 371 national stage filing from International Application No. PCT/CA2009/000392 filed Apr. 1, 2009, which claims priority to Canadian Patent Application No. 2,630,199, filed May 1, 2008, the teachings of which are incorporated herein by reference.

FIELD OF THE INVENTION

This invention relates to an auxiliary hydraulic system for vehicles, in particular light and medium duty pick-up trucks of weight classifications one or two, that is configured to supply hydraulic fluid to both on-board and off-board auxiliary equipment using a unique microprocessor controlled multi-piston fluid pump.

BACKGROUND OF THE INVENTION

On-board auxiliary hydraulic systems for work vehicles are well known in the art with agricultural equipment such as tractors and construction equipment such as excavators typically providing fully integrated arrangements. These integrated auxiliary hydraulic systems can be supplied either by the work vehicle's main hydraulic source, if it has sufficient capacity beyond hydrostatic drive and other primary demands or by a separate dedicated pump. In either case the auxiliary hydraulic system includes a number of proportional and directional valves for controlling the hydraulic fluid flow to the auxiliary equipment. U.S. Pat. No. 4,043,099 to Cheatum describes such an auxiliary hydraulic system that utilizes a tractor's main hydraulic source to power a pair of auxiliary actuators that automate the movement of the windrow pick-up mechanism and swingable tongue of a pull type agricultural harvesting machine.

It is less common for road going vehicles to include an auxiliary hydraulic system since the integrated hydraulic pumps required for hydrostatic drive and other primary demands are not available. The lack of a primary demand system dictates the usage of a dedicated auxiliary pump which can be either engine driven or incorporated in a self-contained, electric motor driven module. Conventional engine driven systems require a pump mounting and drive system, a decoupling arrangement such as a clutch, distribution lines, switching control and proportional valves. Electric motor driven configurations do not require a decoupling arrangement but add electric motors, extra batteries and associated wiring to the additional complexity. Unless a piece of auxiliary equipment which requires hydraulic supply, such as a snow plow or dump box, has been installed, the associated cost of an auxiliary hydraulic system has been generally deemed to be prohibitive. Therefore, road going, general purpose, light and medium duty pick-up trucks of weight classifications one or two do not generally include auxiliary hydraulic systems even as a customer purchased option.

Some exceptions do exist, including the Mercedes-Benz Unimog™ which is a heavy duty utility truck of weight class two or three, capable of both on and off road usage. In addition to general purpose use the Unimog™ is also a very popular military vehicle and is utilized as a base for fire vehicles and the like. The Unimog™ is unique in that it crosses the boundary between pure utility vehicles such as agricultural tractors, and road going vehicles such as pick-up trucks. Like an agricultural tractor, it offers fully locked all wheel drive, mechanical power take-off and most significantly, auxiliary hydraulic supply provided by an engine driven dedicated pump.

Aftermarket auxiliary equipment for light and medium duty pick-up trucks of weight classifications one or two, such as snow plows, lift gates and dump boxes commonly include self-contained, electric motor driven hydraulic supplies. In the case of a snow plow the hydraulic supply represents half of the total system cost. U.S. Pat. No. 3,706,144 to Miceli describes a simple snow plow system for use on a light truck that is targeted at providing a less expensive solution to commercial removal equipment. However, although simplistic, the Miceli prior art still requires an electric motor-driven pump, selector valve, angle control valve, plow-lowering valve, reservoir tank and associated valve solenoids in addition to the plow, mounting structure and hydraulic cylinders. If a number of pieces of auxiliary equipment are added to a pick-up truck then it is forced to carry an equal number of associated electric motor driven hydraulic supplies. Stand alone, self-contained, electric motor driven auxiliary hydraulic modules are also available for mounting on vehicles to supply any number of remote auxiliary equipment requirements such as log splitters, hydraulic lift cylinders and the like. Both the dedicated pump and stand alone electric motor driven hydraulic supply systems commonly utilize a pair of solenoid operated poppet valves to provide flow control. These poppet valves provide on-off control and direction switching but have no proportional flow capability as applications such as snow plows can operate adequately without velocity control.

The facility for rotary mechanical power take off is another common option offered on heavier duty trucks of weight class three and above, when either mechanical drive is required for auxiliary equipment such as winches, mechanical lifts, generator sets, feed mixers and the like or engine driven auxiliary hydraulic pumps as previously described. These power take off units provide appropriate gear reductions to achieve predetermined rotary speeds, such as the agricultural standard requirement of 540 revolutions per minute, and a clutching methodology to decouple the drive. For example, U.S. Pat. No. 6,073,502 to Wallace describes a compact, high horsepower power take off that includes an air actuated shifting mechanism for connecting and disconnecting the system from the engine. Wallace additionally describes how the power take off can be used to drive a hydraulic pump so that the more demanding hydraulic applications of these heavier duty trucks, such as dump beds, aerial buckets, tilt back car carriers and wrecker booms, can be supplied. Again, because of the prohibitive costs associated with mechanical power take off, road going, general purpose, light and medium duty pick-up trucks of weight classifications one or two do not generally include this type of capability although a number of aftermarket manufacturers do offer some limited compatibility units. A major disadvantage of these power take off units is that their output shaft speed varies proportionally with the vehicle's engine speed.

Most off-vehicle light and medium duty utility equipment comes with its own power supply, independent of the final drive configuration. For instance, wood splitters, hydraulic lifts and dump box trailers utilize hydraulic final drive but are powered by dedicated internal combustion engines or electric motors. Other equipment, such as wood chippers, water pumps, electrical generators, power washers and post-hole diggers, tends to be directly mechanically driven using either dedicated internal combustion engines or electric motors. In either case, a large collection of utility equipment tends to result in a large number of associated prime movers with all of the associated maintenance demands such as oil and air filter changes. In the majority of non-industrial applications, as around the home, these prime movers tend to be subjected to relatively low usage, resulting in an extremely poor value proposition.

Pick-up trucks have become extremely popular for light utility use and even regular transportation. This has significantly increased access to these heavier duty vehicles up to weight class two, which offer high power, occasionally diesel, internal combustion engines that are highly capable beyond their primary motivation application. If the internal combustion engine of a pick-up truck could be arranged with simple access for powering on-board and off-board auxiliary equipment such as snow plows, dump boxes and wood splitters, then significant increased utility and cost savings would be realized.

GENERAL DESCRIPTION OF THE INVENTION

Accordingly, it would be advantageous to provide an on-board, integrated, auxiliary hydraulic system for vehicles, in particular pick-up trucks of weight classifications one or two, that utilizes the vehicle's primary internal combustion engine as the power source and is capable of providing hydraulic fluid, under pressure, to a number of access points around the vehicle. Additionally, it would be a significant advantage over the existing art to provide operator commanded fully proportional hydraulic flow at each of the access points without the requirement of internal or external proportional control valves. Another major advantage would be realized if the auxiliary hydraulic system could automatically control the proportional hydraulic flow in response to an operator demand or alternatively, a varying system generated demand independent of the speed of the primary internal combustion engine. A further advantage over the existing art would be realized by utilizing a unique pump that consumes negligible power during zero demand conditions, thereby eliminating the requirement of decoupling from the engine when the auxiliary hydraulic system is not in use.

The present invention provides such an auxiliary hydraulic system and in a principal aspect comprises an engine driven multi-piston fluid pump with electrically selectable poppet valves, as described in U.S. Pat. No. 5,190,446 to Salter et al. and U.S. Pat. No. 5,259,738 to Salter et al.; an associated microprocessor control that facilitates variable output of the fluid pump; a switchable valve arrangement to control hydraulic flow direction; an arrangement of fluid distribution pipes attached to the vehicle that terminate in detachable couplings at a number of predetermined access points; a simple user interface module adapted to command the microprocessor control from either within or in close proximity to the vehicle; wherein a range of different auxiliary equipment can be quickly and simply connected to the system and supplied with hydraulic fluid under pressure with fully controlled proportional flow.

In a principal aspect of the present invention, the multi-piston fluid pump is as described in U.S. Pat. No. 5,190,446 and U.S. Pat. No. 5,259,738 and is configured with three or more radial cylinders, each cylinder containing an electrically selectable poppet valve on the inlet, low pressure manifold side of the pump. By configuring the electrically selectable poppet valves to be normally open and then selectively closing them with an electrical signal during the cylinder's delivery stroke, variable stepped changes in the displacement of the pump can be achieved. The microprocessor control provides real time control of the electrically selectable poppet valves therefore allowing the advantage of a fully proportional flow without the requirement of complex proportional control valves. Another major advantage of this pump arrangement over the prior art is that the selective displacement approach is highly efficient and very little power is required for non-demanded capacity. This feature allows the pump to be directly driven by the vehicle's engine with no requirement for a clutch or similar decoupling arrangement.

In this way the auxiliary hydraulic system of the present invention utilizes the vehicle's primary internal combustion engine as the power source to drive both on-board auxiliary equipment such as snow plows, dump boxes, aerial buckets, tilt back car carriers and wrecker booms and off-board auxiliary equipment such as wood splitters, hydraulic lifts and dump box trailers. This eliminates the requirement for additional self-contained, electric motor driven hydraulic supplies for each piece of auxiliary equipment, significantly simplifies each configuration, eliminates redundancy and reduces costs in comparison to the existing art. For example a snow plow system would no longer require a dedicated power supply and would consist of a simple arrangement of plow, mounting structure and hydraulic cylinders. An additional advantage would be that a common user command interface would be used by all auxiliary equipment.

In a preferred embodiment of the present invention, the vehicle is a pick-up truck of weight class one or two.

In a further aspect of the present invention, the microprocessor control provides both real time control of the electrically selectable poppet valves of the multi-piston fluid pump as well as control of the switchable valve arrangement, which consists of a number of electrically piloted valves, so as to control hydraulic flow direction in response to commands from a simple user interface module.

In another preferred embodiment of the present invention, the simple user interface module is an ergonomically configured enclosure with an uncomplicated arrangement of clearly labeled switches and joysticks that can be either hand held or dashboard mounted and that communicates with the microprocessor control via either a dedicated wire, fibre optic link or, more preferably, a radio frequency arrangement that eliminates physical connection and significantly increases operator freedom of movement.

In a further preferred embodiment of the present invention, the multi-piston fluid pump is mounted to the front of the vehicle's primary internal combustion engine and is provided with a pulley that is adapted to be directly driven by the continuous front end accessory drive (FEAD) serpentine belt that also drives the alternator, power steering pump, air conditioning compressor, water pump and other auxiliary components.

In another aspect of the further preferred embodiment of the present invention, the multi-piston fluid pump replaces the standard power steering pump and a proportion of its output flow is directed to the vehicle's power steering requirements.

In an alternative embodiment of the present invention, the multi-piston fluid pump is mounted to a power take off housing attached to the vehicle's clutch cover, gearbox or four wheel drive transfer case and is driven by a gear arrangement from the output side of the vehicle's powertrain.

Further utility of the auxiliary hydraulic system of the present invention is realized by providing a low cost, positive displacement hydraulic motor of standard configuration that uses rotors, gears, pistons or the like, rigidly mounted to the vehicle structure and connected to the auxiliary hydraulic system via the detachable couplings at one of the system's access points. The motor is configured with an appropriate output shaft, such as the agricultural standard 1⅜ inch diameter, six spline arrangement. The motor additionally includes an integrated speed measurement device, such as a hall effect sensor, to provide information to the microprocessor control so that appropriate real time, closed loop control of the electrically selectable poppet valves of the multi-piston fluid pump can be undertaken to provide an appropriate hydraulic flow to achieve constant rotation speed of the hydraulic motor independent of the vehicle's engine speed. In this manner a power take off arrangement is provided that can operate at standard constant speeds, such as the agricultural requirement of 540 revolutions per minute, without operator intervention, while the vehicle's engine speed is independently varied.

In a preferred embodiment of the power take off arrangement, the positive displacement hydraulic motor is provided with a mounting arrangement compatible with a standard tow hitch receiver so that it can be quickly installed at the rear of the vehicle so as to provide rotary drive to implements such as hay bailers, snow blowers and the like.

In a preferred embodiment of the microprocessor control, output flow is calculated directly from the duty cycle of the electrically selectable poppet valves and shaft speed of the multi-piston fluid pump is instantaneously recorded when a set-point button is activated on the simple user interface module. This combination of information is then utilized to set a target that maintains a constant output flow by varying the duty cycle of the electrically selectable poppet valves in response to changes in the vehicle's engine speed. In this manner, set-point flow can be maintained without full closed loop feedback from the driven auxiliary equipment.

The set point flow control strategy allows a wide range of constant speed auxiliary equipment to be driven by simple hydraulic motors supplied by the auxiliary hydraulic system of the present invention. These auxiliary equipment devices can include water pumps, generators, concrete mixers, winches, high speed blowers and refuse compactors as well as a wide range of other applications.

Further aspects of the invention will become apparent from the following description.

DETAILED DESCRIPTION OF THE INVENTION

Figure 1:
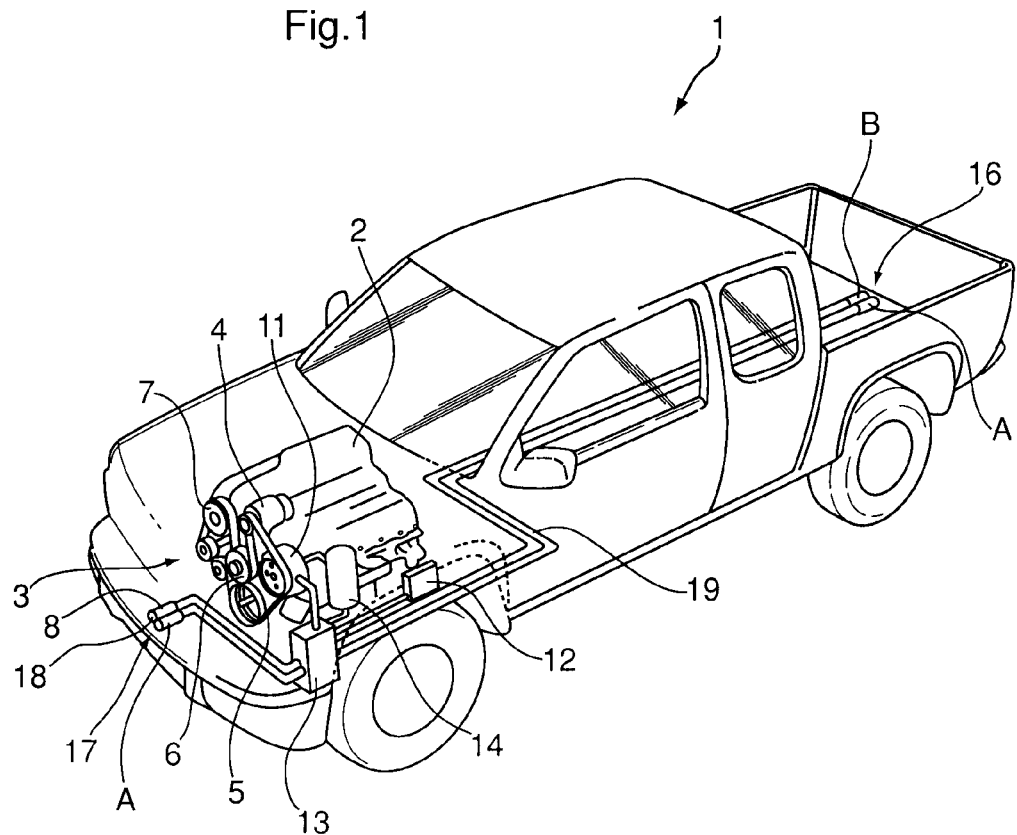
FIG. 1 is a partial cutaway perspective view of a pick-up truck with the inventive auxiliary hydraulic system installed.

Referring to FIG. 1, a pick-up truck (1) of weight class one or two is conventionally powered by an internal combustion engine (2). The internal combustion engine (2) is configured with a front end accessory drive (FEAD) (3) consisting of a multi-grooved serpentine belt (5) arranged to drive a number of conventional ancillary components such as an alternator (4), water pump (6) and air conditioning compressor (7). The FEAD is additionally configured to drive a multi-piston fluid pump (11) capable of delivering hydraulic fluid under pressure. The multi-piston fluid pump (11) contains electrically selectable poppet valves configured to facilitate variable output. The electrically selectable poppet valves are powered via a microprocessor control (12) so that predetermined proportional hydraulic flow is supplied to a distribution valve block (13) by the multi-piston fluid pump (11). A reservoir (14) is connected so as to supply the pump with an adequate volume of hydraulic fluid at all demands as well as to receive returned hydraulic fluid from the distribution valve block (13). A system of fluid distribution pipes (19) is attached to the pick-up truck (1) and is routed from the distribution valve block (13) to a number of predetermined access points (16)(17). The fluid distribution pipes (19) are routed in pairs and terminate in standard detachable couplings (18) at the predetermined access points (16)(17). The distribution valve block (13) contains an switchable valve arrangement consisting of a number of electrically piloted valves that determine to which predetermined access points (16)(17) the proportional hydraulic flow is directed. Additionally, the electrically piloted valves of the distribution valve block (13) also determine the directional state of each pair of fluid distribution pipes. Each pair of fluid distribution pipes is configured with an A pipe and a B pipe and the distribution valve block (13) can direct that the high pressure hydraulic fluid is routed to either the A pipe or the B pipe with the other routed to the reservoir (14).

Figure 2:
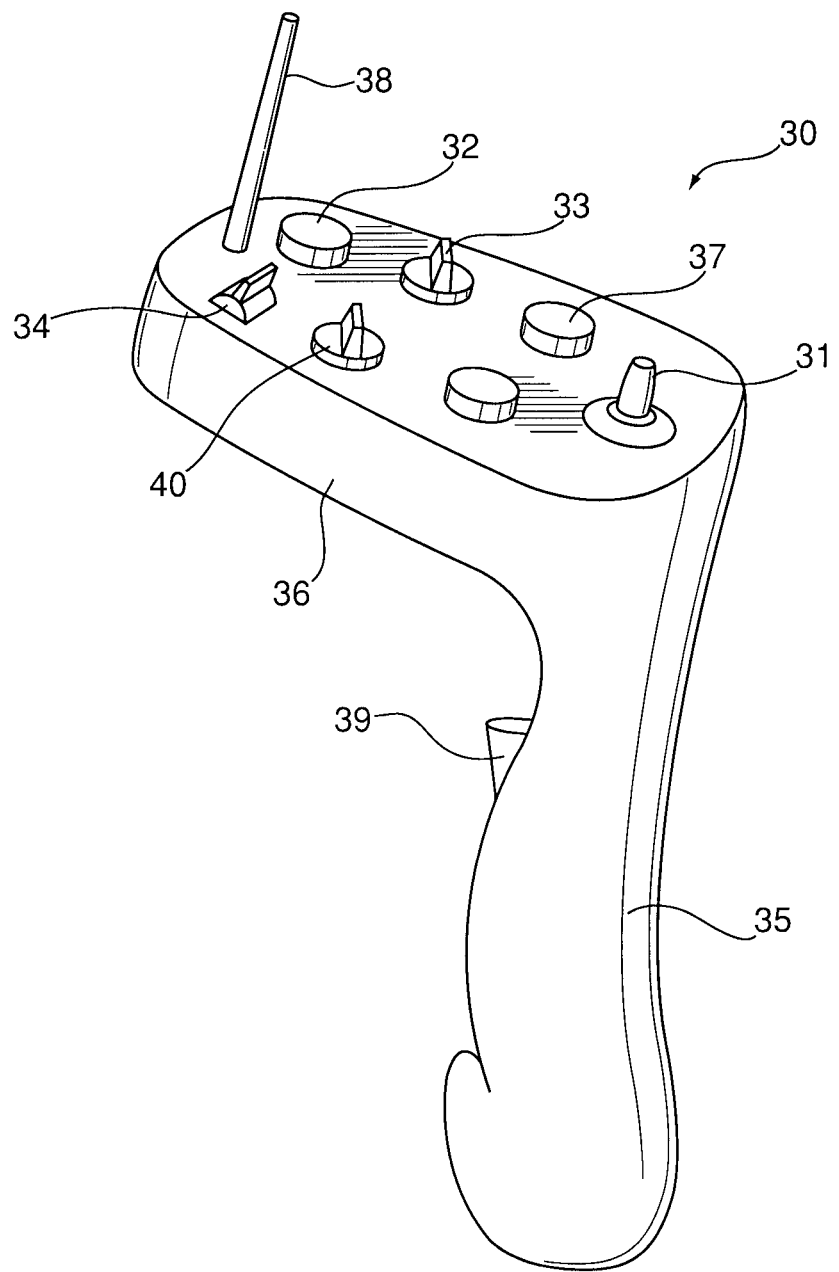
FIG. 2 is a perspective view of the user interface module of the inventive auxiliary hydraulic system.
Figure 3:
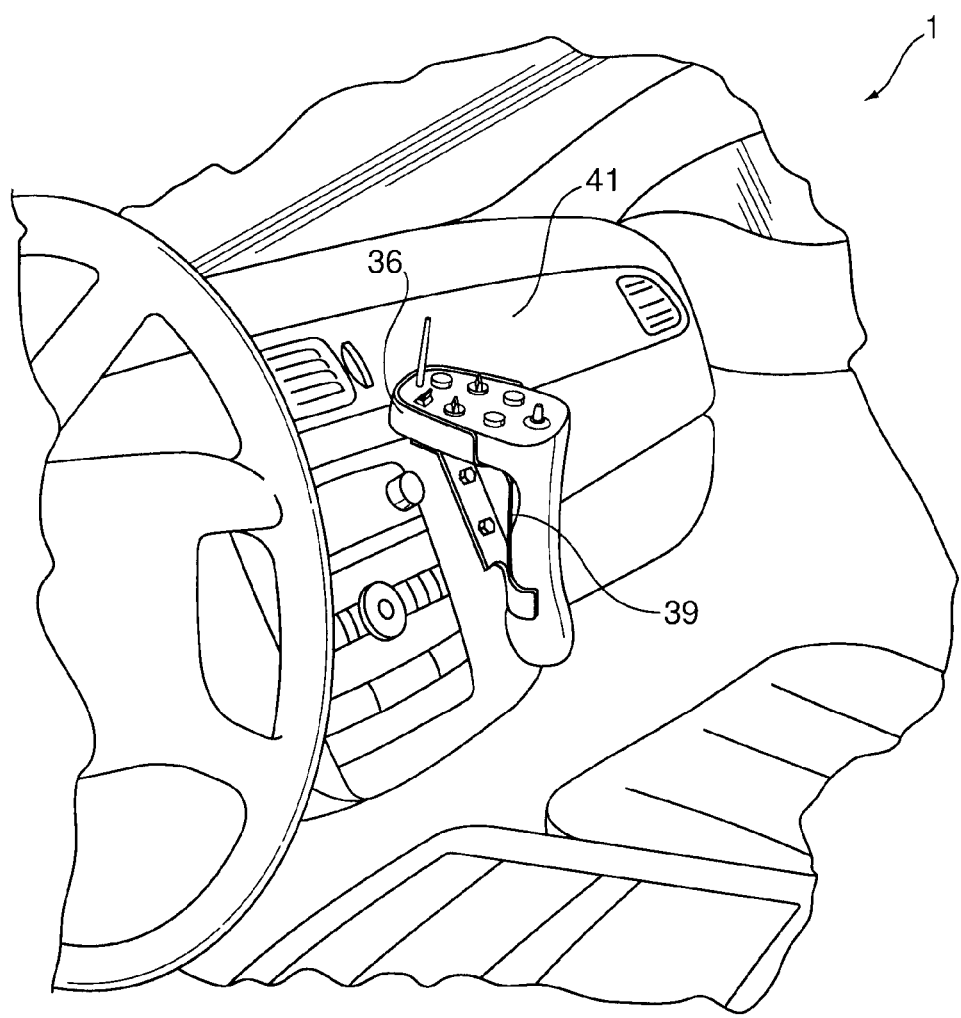
FIG. 3 is a perspective view of the user interface module of the inventive auxiliary hydraulic system shown mounted to the dash panel of the pick-up truck.

Referring to FIGS. 2 and 3, a simple user interface module (30) is configured with an ergonomically designed handle (35), dead man trigger (39) and a simple bracket (36) that facilitates detachable mounting to the dash panel (41) of the pick-up truck (1) and also defeats the dead man trigger (39) when attached to the dash panel. The user interface module (30) contains a control joystick (31), a main power switch (32), an access point selector switch (33), a directional control switch (34), a control strategy selector switch (40) and a set-point button (37). An antenna (38) facilitates radio communication with the microprocessor control (12) so that command signals are transmitted between the user interface module (30) and microprocessor control (12) within a reasonable working range of the pick-up truck (1).

Figure 4:
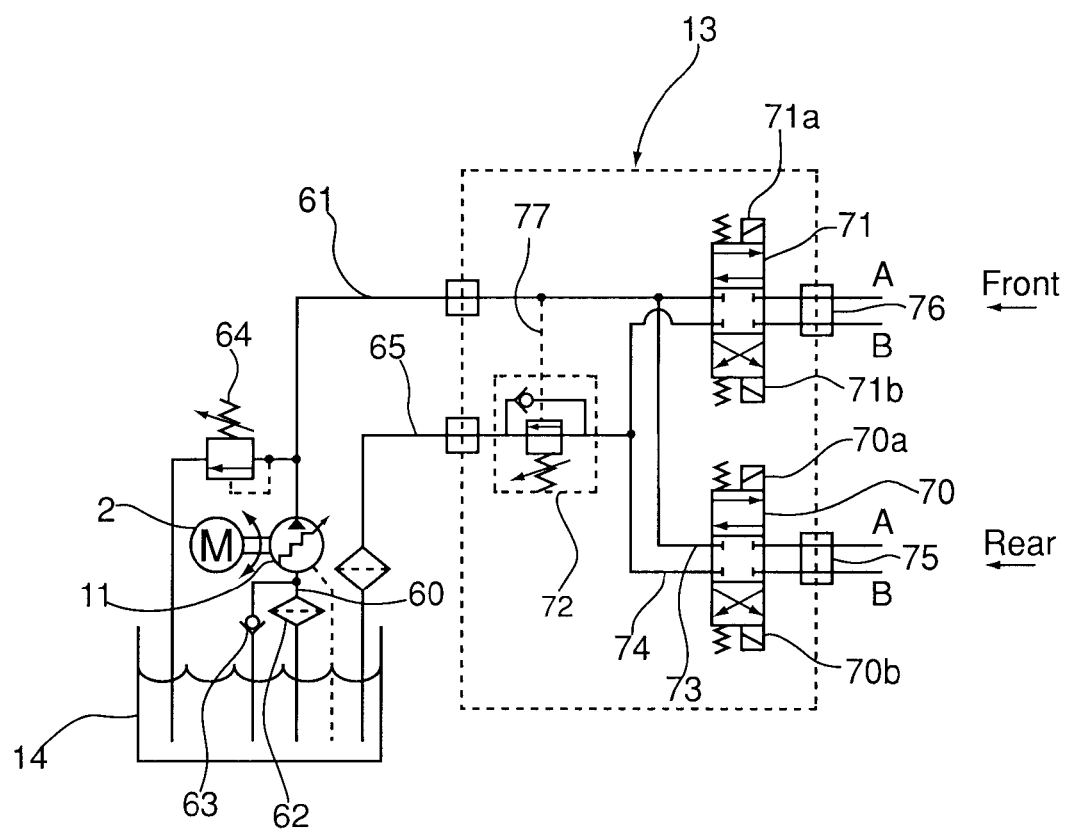
FIG. 4 is a schematic illustration of the hydraulic circuit of the inventive auxiliary hydraulic system.

FIG. 4 illustrates the circuit diagram associated with the auxiliary hydraulic system previously described. The internal combustion engine (2) drives the multi-piston fluid pump (11) that draws its hydraulic supply from the reservoir (14) via a low pressure pipe (60) and provides hydraulic fluid under pressure to a supply pipe (61) that is directly connected to the distribution valve block (13). A filter (62) and bypass check valve (63) arrangement are provided in the low pressure pipe (60) to assure clean hydraulic fluid is supplied to the multi-piston fluid pump (11). A pressure relief valve (64) is configured to protect against inadvertent over loading of the system. The distribution valve block (13) contains two electrically piloted three way valves (70)(71), an overcentre valve (72), an internal high pressure manifold (73), an internal low pressure manifold (74) and two sets of fluid distribution pipe connections (75)(76). The supply pipe (61) is connected to the high pressure manifold (73) of the distribution valve block (13) and a return line (65) is adapted to connect to the low pressure manifold (74) of the distribution valve block (13). Each fluid distribution pipe connection (75)(76) has an A port and a B port. The overcentre valve (72) is connected to the high pressure manifold (73) via an internal signal connection (77) so that the fluid flow in the low pressure manifold (74) is blocked unless the multi-piston fluid pump (11) is supplying the high pressure manifold (73). Referring to both FIGS. 1 and 4, the two electrically piloted three way valves (70)(71) are each configured with two electrical solenoid pilots (70a)(70b)

(71a)(71b) which are connected to the appropriate power output stage of the microprocessor control (12) and allow selection of four operating states as follows:

- The first electrically piloted three way valve (70) is actuated to its first position via a signal to its first electrical solenoid pilot (70a) and the multi-piston fluid pump (11) supplies hydraulic fluid under pressure to port A of the first fluid distribution pipe connection (75) which is then routed via the fluid distribution pipes (19) to the A pipe of the rear predetermined access point (16). With the first electrically piloted three way valve (70) actuated to its first position via a signal to its first electrical solenoid pilot (70a), port B of the first fluid distribution pipe connection (75) is connected to the low pressure manifold (74) and then to the reservoir (14) via the overcentre valve (72) allowing a continuous fluid circuit to operate.
- The first electrically piloted three way valve (70) is actuated to its second position via a signal to its second electrical solenoid pilot (70b) and the multi-piston fluid pump (11) supplies hydraulic fluid under pressure to port B of the first fluid distribution pipe connection (75) which is then routed via the fluid distribution pipes (19) to the B pipe of the rear predetermined access point (16). With the first electrically piloted three way valve (70) actuated to its second position via a signal to its second electrical solenoid pilot (70b), port A of the first fluid distribution pipe connection (75) is connected to the low pressure manifold (74) and then to the reservoir (14) via the overcentre valve (72) allowing a continuous fluid circuit to operate.
- The second electrically piloted three way valve (71) is actuated to its first position via a signal to its first electrical solenoid pilot (71a) and the multi-piston fluid pump (11) supplies hydraulic fluid under pressure to port A of the second fluid distribution pipe connection (76) which is then routed via the fluid distribution pipes (19) to the A pipe of the front predetermined access point (17). With the second electrically piloted three way valve (71) actuated to its first position via a signal to its first electrical solenoid pilot (71a) port B of the second fluid distribution pipe connection (76) is connected to the low pressure manifold (74) and then to the reservoir (14) via the overcentre valve (72) allowing a continuous fluid circuit to operate.
- The second electrically piloted three way valve (71) is actuated to its second position via a signal to its second electrical solenoid pilot (71b) and the multi-piston fluid pump (11) supplies hydraulic fluid under pressure to port B of the second fluid distribution pipe connection (76) which is then routed via the fluid distribution pipes (19) to the B pipe of the front predetermined access point (17). With the second electrically piloted three way valve (71) actuated to its second position via a signal to its second electrical solenoid pilot (71b), port A of the second fluid distribution pipe connection (76) is connected to the low pressure manifold (74) and then to the reservoir (14) via the overcentre valve (72) allowing a continuous fluid circuit to operate.

Both of the two electrically piloted three way valves (70)(71) are configured to be closed centre so no hydraulic flow can occur through either valve when no pilot signal is applied. FIG. 4 illustrates only two predetermined access point circuits and therefore only two electrically piloted three way valves (70)(71), but the distribution valve block (13) can be configured to supply multiple circuits with as many electrically piloted three way valves as are necessary.

Referring to FIGS. 1, 2 and 4, the microprocessor control (12) contains a high power digital processor, at least two power output stages configured to power both the electrically selectable poppet valves of the multi-piston fluid pump (11) and the electrically piloted three way valves of the distribution valve block (13), and a radio frequency interface with associated encoding and multiplexing to communicate with the user interface module (30). The digital processor is capable of interpreting command signals from the user interface module (30) and sending the appropriate output, via the power output stage, to the electrically selectable poppet valves of the multi-piston fluid pump (11) so as to provide real time, operator commanded control of proportional hydraulic flow. Additionally, the digital processor is capable of interpreting command signals from the user interface module and sending the appropriate output, via the power output stage, to the electrically piloted three way valves of the distribution valve block (13) so as to direct hydraulic fluid flow to an operator commanded predetermined access point with an operator commanded flow direction. The selection of which electrically piloted three way valve (70)(71) will receive a signal from the first of the two power output stages is chosen via the access point selector switch (33) on the user interface module (30). The selection of which electrical solenoid pilot (70a)(70b)(71a)(71b) receives a signal from the first of the two power output stages is made via the control joystick (31) or the directional control switch (34) on the user interface module (30). Additionally, the control joystick (31) also provides the demand signal to the second of the two power output stages of the microprocessor control (12) which in turn provides the appropriate output to the electrically selectable poppet valves of the multi-piston fluid pump (11) so as to provide real time, operator commanded control of proportional hydraulic flow. Additionally, the digital processor of the microprocessor control (12) is capable of interpreting combined command signals from the user interface module (30) and inputs from selected remote sensors so as to undertake closed loop, real time control calculations so that commanded primary outputs such as hydraulic cylinder extension or hydraulic motor rotary speed can be maintained independently of outside influences such as the input speed of the multi-piston fluid pump (11). The microprocessor control (12) is configured so that only one of the electrically piloted three way valves (70)(71) can be selected at a time.

Figure 5:
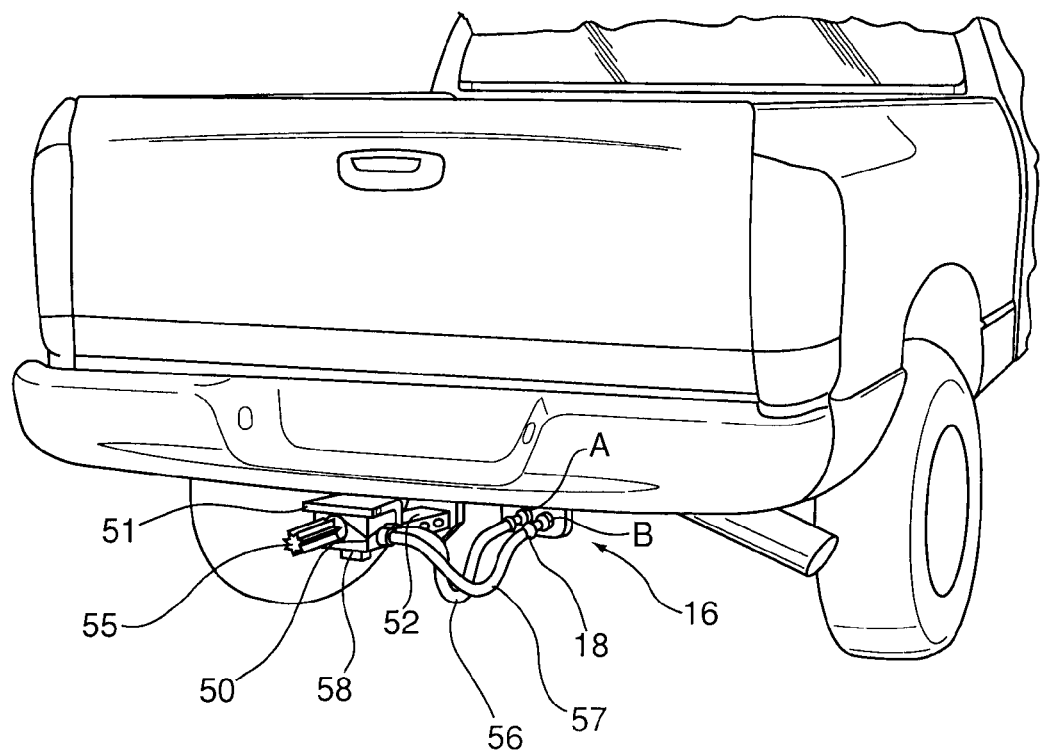
FIG. 5 is a perspective view of a hydraulic motor driven power take off installed at the rear of a pick-up truck and connected to the inventive auxiliary hydraulic system.

FIG. 5 illustrates an application of the auxiliary hydraulic system of the present invention in which a rotary mechanical power take off drive is provided by a low cost, positive displacement hydraulic motor (50) of standard configuration that uses rotors, gears, pistons or the like, detachably mounted to the vehicle structure via a mounting arrangement (51) that is configured to be compatible with the standard tow hitch receiver (52) of the vehicle. The positive displacement hydraulic motor (50) is provided with an output shaft (55) configured with an agricultural power take off standard 1⅜ inch diameter, six spline arrangement. The hydraulic motor (50) is connected to the A and B pipes of the rear predetermined access point (16) via flexible hoses (56)(57) and connectors compatible with the standard detachable couplings (18) of the auxiliary hydraulic system of the present invention. Referring to FIGS. 1 and 5, the motor additionally includes an integrated speed measurement device (58), such as a hall effect sensor, to provide information to the microprocessor control (12) so that appropriate real time, closed loop control of the electrically selectable poppet valves of the multi-piston fluid pump (11) can be undertaken to provide an appropriate hydraulic flow to achieve constant rotation speed of the output shaft (55) of the hydraulic motor (50) independently of the vehicle's engine speed. In this manner, a power take off arrangement is provided that can operate at standard constant speeds, such as the agricultural requirement of 540 revolutions per minute, without operator intervention, while the vehicle's engine speed is independently varied so as to provide rotary drive to implements such as hay bailers, snow blowers and the like.

In a preferred embodiment of the microprocessor control (12), output flow is calculated directly from the duty cycle of the electrically selectable poppet valves and shaft speed of the multi-piston fluid pump (11) is instantaneously recorded when the set-point button (37) is activated on the user interface module (30). This combination of information is then utilized to set a target that maintains a constant output flow by varying the duty cycle of the electrically selectable poppet valves in response to changes in the vehicle's engine speed. In this manner, set-point flow can be maintained without full closed loop feedback from the driven auxiliary equipment.

Figure 6:
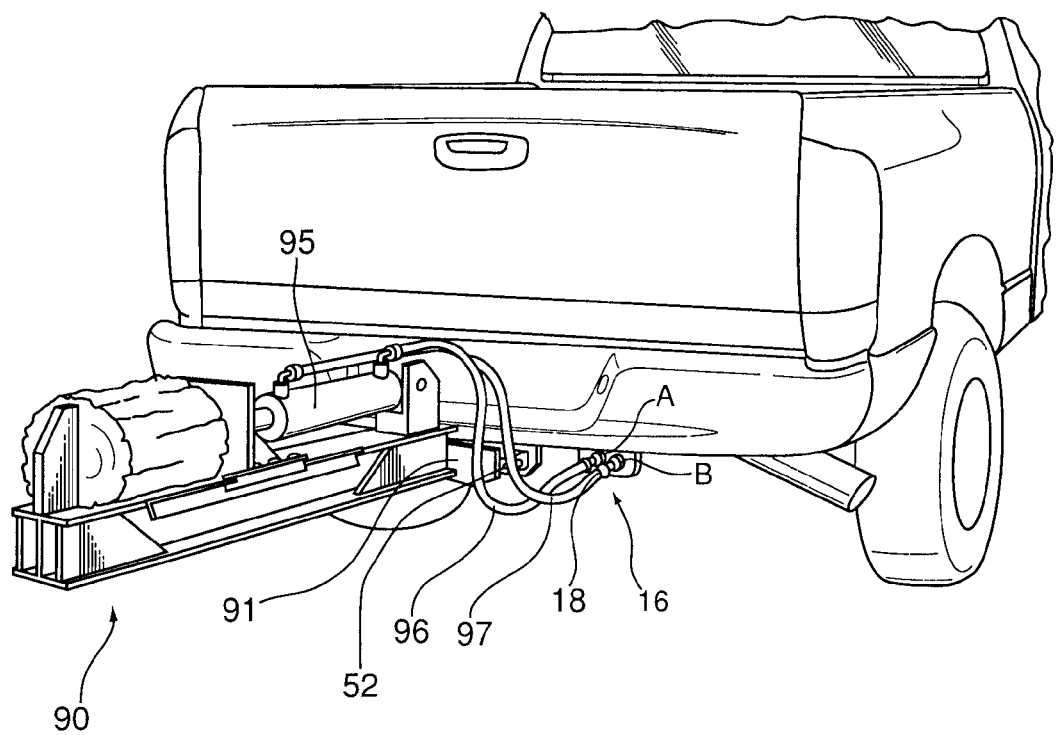
FIG. 6 is a perspective view of a wood splitter installed in the hitch receiver at the rear of a pick-up truck and connected to the inventive auxiliary hydraulic system.

FIG. 6 illustrates a further application of the auxiliary hydraulic system of the present invention in which a wood splitter (90) has been adapted to be detachably mounted to the vehicle structure via a mounting arrangement (91) that is configured to be compatible with the standard tow hitch receiver (52) of the vehicle. The wood splitter (90) is provided with an actuation cylinder (95) that is connected to the A and B pipes of the rear predetermined access point (16) via flexible hoses (96)(97) and connectors compatible with the standard detachable couplings (18) of the auxiliary hydraulic system of the present invention. Additionally referring to FIGS. 1 and 2, when using the wood splitter the internal combustion engine (2) of the pick-up truck (1) is set at a high idle condition of approximately 1000 RPM with an automatic transmission set in park or a standard transmission in neutral with the emergency brake on. The user interface module (30) is detached from the dash panel and is utilized in a hand held mode by the user external to the pick-up truck (1). The rear predetermined access point (16) is chosen via the access point selector switch (33) on the user interface module (30) and the control joystick (31) is then used to choose the direction of movement of the actuation cylinder (95) of the wood splitter (90). The microprocessor control (12) will only provide command signals from its two power output stages when the dead man trigger (39) of the user interface module (30) is depressed. In this way, if the user interface module (30) is dropped then the auxiliary hydraulic system is shut down.

The invention claimed is:

1. An auxiliary hydraulic system for a vehicle, comprising:
   a) an engine driven multi-piston fluid pump comprising electrically selectable poppet valves;
   b) a microprocessor control that controls the electrically selectable poppet valves to facilitate a variable output;
   c) a switchable valve arrangement to control flow direction of hydraulic fluid;
   d) an arrangement of fluid distribution pipes attached to the vehicle that terminate in detachable couplings at a number of predetermined access points;
   e) a simple user interface module adapted to command the microprocessor control from either within or in close proximity to the vehicle;
   such that a range of different auxiliary equipment can be quickly and simply connected to the auxiliary hydraulic system and supplied with hydraulic fluid under pressure with fully controlled proportional flow.

2. The auxiliary hydraulic system of claim 1, wherein the vehicle is a pick-up truck of weight class one or two.

3. The auxiliary hydraulic system of claim 1, wherein the microprocessor control provides both real time control of the electrically selectable inlet poppet valves of the multi-piston fluid pump and control of the switchable valve arrangement to control flow direction of hydraulic fluid in response to commands from the simple user interface module.

4. The auxiliary hydraulic system of claim 1, wherein the multi-piston fluid pump is mounted to a front of a primary internal combustion engine of the vehicle and is provided with a pulley that is adapted to be directly driven by the continuous front end accessory drive (FEAD) serpentine belt that also drives an alternator, power steering pump, air conditioning compressor, water pump and other auxiliary components of the vehicle.

5. The auxiliary hydraulic system of claim 4, wherein the multi-piston fluid pump replaces the standard vehicle power steering pump and a portion of its output flow is directed to power steering requirements of the vehicle.

6. The auxiliary hydraulic system of claim 1, wherein the multi-piston fluid pump is mounted to a power take off housing attached to a clutch cover, gearbox or four wheel drive transfer case of the vehicle and is driven by a gear arrangement from the output side of a powertrain of the vehicle.

7. The auxiliary hydraulic system of claim 1, wherein the microprocessor control is adapted to provide closed loop control of the electrically selectable poppet valves of the multi-piston fluid pump via electrical signals received from remote sensors that are adapted to monitor the motion of the auxiliary equipment so as to control the response of the auxiliary equipment independently of the engine speed of the vehicle.

8. The auxiliary hydraulic system of claim 1, wherein the microprocessor control is adapted to provide automated control of the electrically selectable poppet valves of the multi-piston fluid pump via an indirect calculation of the motion of the auxiliary equipment using a combination of a duty cycle of the electrically selectable poppet valves and an engine speed of the vehicle so as to control response of the auxiliary equipment independently of the engine speed of the vehicle.

9. The auxiliary hydraulic system of claim 1, wherein the auxiliary equipment is a positive displacement hydraulic motor that is adapted to be rigidly mounted to a structure of the vehicle and is configured with an agricultural standard 1[⅜] inch diameter, six spline shaft so as to provide a mechanical rotary power take off.

10. The auxiliary hydraulic system of claim 1, wherein the auxiliary equipment is a positive displacement hydraulic motor that is adapted to drive rotary industrial equipment such as concrete mixers, water pumps, wood chippers, power washers, post hole diggers, electrical generators, winches, high speed blowers, salt spreaders and other similar devices.

11. The auxiliary hydraulic system of claim 1, wherein the auxiliary equipment is a double acting hydraulic cylinder that is adapted to actuate linear industrial equipment such as snow plows, refuse compactors, hydraulic lifts, dump box trailers and other similar devices.

12. An auxiliary hydraulic system for a vehicle, comprising:
   a) a multi-piston fluid pump with electrically selectable poppet valves mounted to a front of a primary internal combustion engine of the vehicle and provided with a pulley that is adapted to be directly driven by a continuous front end accessory drive (FEAD) serpentine belt that also drives an alternator, power steering pump, air conditioning compressor, water pump and other auxiliary components;
   b) a switchable valve arrangement to control flow direction of hydraulic fluid;

c) the multi-piston fluid pump being provided with an associated microprocessor control that provides both real time control of the electrically selectable inlet poppet valves as well as control of the switchable valve arrangement to control flow direction of hydraulic fluid in response to operator commands;

d) the microprocessor control facilitating variable output flow of hydraulic fluid and being adapted to provide closed loop control of the electrically selectable poppet valves via electrical signals received from remote sensors;

e) an arrangement of fluid distribution pipes attached to the vehicle that terminate in detachable couplings at a number of predetermined access points;

f) a simple user interface module adapted to transfer operator commands to the microprocessor control from either within or in close proximity to the vehicle;

such that a range of different auxiliary equipment can be quickly and simply connected to the system and supplied with hydraulic fluid under pressure with proportional flow either commanded by the operator or in closed loop control commanded via electrical signals received from the remote sensors that are adapted to monitor the motion of the auxiliary equipment so that the response of the auxiliary equipment is independent of an engine speed of the vehicle.

13. The auxiliary hydraulic system of claim 12, wherein the vehicle is a pick-up truck of weight class one or two.

14. The auxiliary hydraulic system of claim 12, wherein the multi-piston fluid pump replaces a standard power steering pump of the vehicle and a portion of its output flow is directed to power steering requirements of the vehicle.

15. The auxiliary hydraulic system of claim 12, wherein the auxiliary equipment is a positive displacement hydraulic motor that is adapted to be rigidly mounted to a structure of the vehicle and is configured with an agricultural standard 1[3/8] inch diameter, six spline shaft so as to provide a mechanical rotary power take off and is closed loop controlled to the agricultural standard power take off speed of 540 RPM.

16. The auxiliary hydraulic system of claim 12, wherein the auxiliary equipment is a positive displacement hydraulic motor that is adapted to drive rotary industrial equipment such as concrete mixers, water pumps, wood chippers, power washers, post hole diggers, electrical generators, winches, high speed blowers, salt spreaders and other similar devices.

17. The auxiliary hydraulic system of claim 12, wherein the auxiliary equipment is a double acting hydraulic cylinder that is adapted to actuate linear industrial equipment such as snow plows, refuse compactors, hydraulic lifts, dump box trailers and other similar devices.

18. An auxiliary hydraulic system for a vehicle, comprising:

a) a multi-piston fluid pump with electrically selectable poppet valves mounted to a front of a primary internal combustion engine of the vehicle and provided with a pulley that is adapted to be directly driven by a continuous front end accessory drive (FEAD) serpentine belt that also drives an alternator, power steering pump, air conditioning compressor, water pump and other auxiliary components of the vehicle;

b) a switchable valve arrangement to control flow direction of hydraulic fluid;

c) the multi-piston fluid pump being provided with an associated microprocessor control that provides both real time control of the electrically selectable inlet poppet valves as well as control of the switchable valve arrangement to control flow direction of hydraulic fluid in response to operator commands;

d) the microprocessor control facilitating variable output flow of hydraulic fluid and being adapted to provide automated control of the electrically selectable poppet valves via an indirect calculation of output flow of hydraulic fluid using a combination of a duty cycle of the electrically selectable poppet valves and an engine speed of the vehicle;

e) an arrangement of fluid distribution pipes attached to the vehicle that terminate in detachable couplings at a number of predetermined access points;

f) a simple user interface module adapted to transfer operator commands to the microprocessor control from either within or in close proximity to the vehicle;

such that a range of different auxiliary equipment can be quickly and simply connected to the system and supplied with hydraulic fluid under pressure with proportional flow either directly commanded by the operator or automatically controlled via the indirect calculation of output hydraulic flow so that the response of the auxiliary equipment is independent of the engine speed of the vehicle.

19. The auxiliary hydraulic system of claim 18, wherein the vehicle is a pick-up truck of weight class one or two.

20. The auxiliary hydraulic system of claim 18, wherein the multi-piston fluid pump replaces a standard power steering pump of the vehicle and a portion of its output flow is directed to power steering requirements of the vehicle.

21. The auxiliary hydraulic system of claim 18, wherein the auxiliary equipment is a positive displacement hydraulic motor that is adapted to be rigidly mounted to a structure of the vehicle and is configured with an agricultural standard 1[3/8] inch diameter, six spline shaft so as to provide a mechanical rotary power take off and is automatically controlled to the agricultural standard power take off speed of 540 RPM.

22. The auxiliary hydraulic system of claim 18, wherein the auxiliary equipment is a positive displacement hydraulic motor that is adapted to drive rotary industrial equipment such as concrete mixers, water pumps, wood chippers, power washers, post hole diggers, electrical generators, winches, high speed blowers, salt spreaders and other similar devices.

23. The auxiliary hydraulic system of claim 18, wherein the auxiliary equipment is a double acting hydraulic cylinder that is adapted to actuate linear industrial equipment such as snow plows, refuse compactors, hydraulic lifts, dump box trailers and other similar devices.

* * * * *

UNITED STATES PATENT AND TRADEMARK OFFICE
CERTIFICATE OF CORRECTION

PATENT NO.         : 8,589,026 B2
APPLICATION NO.    : 12/936316
DATED              : November 19, 2013
INVENTOR(S)        : Laurence J. Holt It is certified that error appears in the above-identified patent and that said Letters Patent is hereby corrected as shown below:

In the Claims

Claim 9, (Column 10, line 42), delete "[" after 1 and delete "]" after 3/8.

Claim 15, (Column 11, line 36), delete "[" after 1 and delete "]" after 3/8.

Claim 21, (Column 12, line 42), delete "[" after 1 and delete "]" after 3/8.

Signed and Sealed this
Twentieth Day of May, 2014

Michelle K. Lee
*Deputy Director of the United States Patent and Trademark Office*